Patented May 22, 1951

2,554,443

UNITED STATES PATENT OFFICE 2,554,443

AZO SAFRANINE LEATHER DYESTUFFS

John J. Hayden, Hoosick Falls, N. Y., assignor to General Aniline & Film Corporation, New York, N. Y., a corporation of Delaware No Drawing. Application November 13, 1947, Serial No. 785,801

4 Claims. (Cl. 260—154)

This invention relates to azo dyestuffs of the safranine series and their application for the dyeing of leather.

In dyeing leather, particularly chrome tanned leather, dyestuffs yielding brilliant shades having satisfactory fastness properties are often defective in other respects, for example, in that they lack adequate water solubility, fail to yield even dyeings, or especially in that they fail to penetrate the leather sufficiently. When insufficient penetration occurs, articles made from the dyed leather are unduly susceptible to marring by mechanical wear or scuffing. Only in exceptional cases, were dyestuffs found heretofore which possessed all of the desired qualities for leather dyeing. Hence, it was exceedingly difficult to provide a series of dyestuffs having the required leather dyeing qualities and at the same time providing a satisfactory range of full, dense, brilliant colorations.

I have discovered that dyestuffs for leather, especially chrome leather, having outstanding penetrating power and good solubility in water, and yielding dense, brilliant, even colorations of good fastness qualities are obtained by coupling a monodiazo safranine compound with an N-hydroxyalkyl-arylamine compound in which the N-hydroxyalkyl group contains at least two carbon atoms, and which is adapted to couple in para-position to the N-hydroxyalkylamino group. Thus, dyestuffs of my invention are obtained by diazotizing a safranine compound containing a diazotizable amino group, and coupling the resulting diazo compound, preferably in acid medium, with an N-hydroxyalkyl-arylamine compound of the aforesaid type which is unsubstituted in para-position to the hydroxyalkylamino group. The second hydrogen of the hydroxyalkylamino group can be unsubstituted, or may be replaced by an alkyl, aralkyl or aryl group or a second hydroxyalkyl group. The N-hydroxyalkyl-arylamine compound may be otherwise unsubstituted, or may contain additional nuclear substituents such as halogen, alkyl, alkoxy, alkylamino, hydroxyalkylamino and acylamido groups.

The dyestuffs of my invention correspond to the general formula:

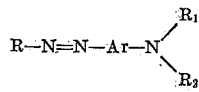

wherein R is the radical of a safranine compound;

$R_1$ is a member of the group consisting of hydrogen, alkyl, aralkyl and aryl groups, and an hydroxyalkyl group of at least two carbon atoms; $R_2$ is an hydroxyalkyl group of at least two carbon atoms (as for example, a 2-hydroxyethyl, 2,3-dihydroxypropyl or a 2,3,4-tri-hydroxybutyl group); and Ar is an aryl nucleus in which the diazo linkage occupies a position para to the

radical, and additional substituents, if present, are of the class consisting of halogen, alkyl, alkoxy, alkylamino, hydroxyalkylamino, and acylamido groups.

Safranine compounds which are suitable as diazo components for the production of the dyestuffs of this invention include Safranine Y Extra Conc. (Colour Index No. 841), Methylene Violet 3RA (Colour Index No. 842) and its diethylamino analogue, and Safranine 6B (Colour Index No. 843). The principal constituents of these dyestuffs are a mixture of 10-phenyl and 10-o-tolyl-2,7-dimethyl-3,6-diamino phenazinium chloride, 6-dimethylamino-10-phenyl-3-amino phenazinium chloride, 6-diethylamino-10-phenyl-3-amino phenazinium chloride, and 10-phenyl-2-methyl-3-amino-6-dimethylamino phenazinium chloride, all of which yield monodiazo compounds upon diazotization with nitrous acid in the usual manner.

Azo coupling components suitable for use in preparing the dyestuffs of this invention include N-di-2'-hydroxyethylaniline, N-di-2'-hydroxyethyl-m-toluidine, N-ethyl-N-2'-hydroxyethylaniline, N-ethyl-N-2', 3'-dihydroxypropyl-aniline, 3-(N-di-2'-hydroxyethylamino)-acetanilide, N,N,N',N'-tetra-2'-hydroxyethyl- m - phenylenediamine, 3-(N-di-2'-hydroxyethylamino)-p-acetanisidide, 2-chloro-N-di-2'-hydroxyethyl-aniline, N-benzyl-N-2'-hydroxyethyl-aniline, N-phenyl-N-2'-hydroxyethyl-aniline, and N-2'-hydroxyethyl-α-naphthylamine.

The coupling of the aforesaid diazo safranine compounds with the azo coupling components of the class described above is preferably effected in acid medium, e. g., in the presence of acetic acid.

The following examples, wherein temperatures are in degrees C. and parts and percentages are by weight, illustrate the preparation of a number of dyestuffs of my invention.

Example 1

30 parts of a paste of Methylene Violet 3RA diethyl analogue having the formula:

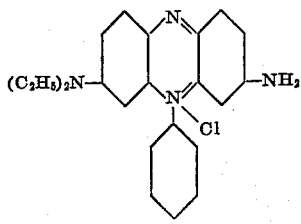

containing 80% solids, and 16 parts of concentrated sulfuric acid were added to 1500 parts of water previously cooled with ice to 12°. 3.45 parts of sodium nitrite were added to the mixture and the latter was maintained at a temperature below 15° for one hour. After removing excess nitrite, a solution of 11 parts of N-di-2'-hydroxyethyl-aniline, and sufficient sulfuric acid to effect solution thereof, in 30 parts of water was added to the diazotization mixture, followed by 20 parts of sodium acetate. The mixture was agitated for one hour, and then warmed to 45°. A sufficient amount of hydrochloric acid was then added to bring the pH of the mixture to 2.5 to 3.0, and the dyestuff was salted out by addition of 375 parts of sodium chloride. Upon filtering the mixture and drying the filter cake, a water-soluble dyestuff was obtained, dyeing chrome leather in bright greenish-black shades, and having excellent penetrating and working properties. The probable formula of the dyestuff was as follows:

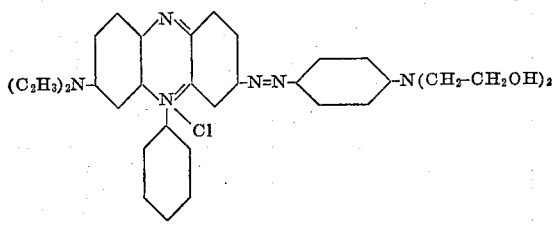

Example 2

A dyestuff was prepared by the same procedure as that of Example 1 except that 11.5 parts of N-di-2'-hydroxyethyl-m-toluidine was employed instead of N-di-2'-hydroxyethyl aniline.

The dyestuff thus obtained possessed dyeing properties similar to those of the dyestuff of Example 1, and yielded brilliant dark green shades on leather. Its probable formula was as follows:

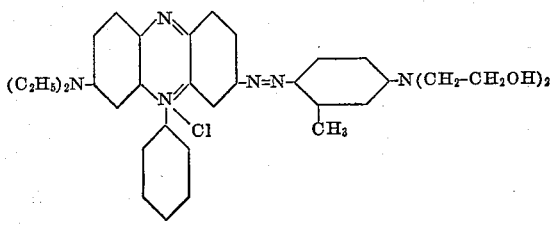

Example 3

A dyestuff similar in shade and dyeing properties to the dyestuff of Example 1 was obtained by the same procedure as that described in Example 1 except that 9.6 parts of N-ethyl-N-2'-hydroxyethyl aniline were substituted for N-di-2'-hydroxyethyl aniline of said example. The dyestuff has the probable formula:

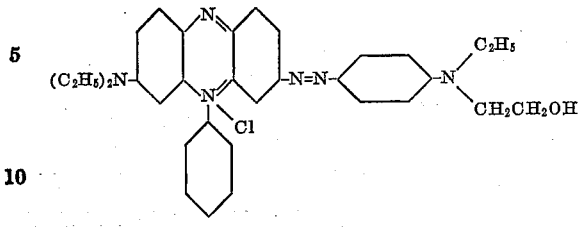

Example 4

The procedure of Example 1 was repeated, substituting 16 parts of 3-(N-di-2'-hydroxyethyl-amino)-acetanilide for the N-di-2'-hydroxyethyl aniline of said example. A dyestuff yielding a brilliant dark green shade, and having dyeing properties similar to those of the dyestuffs of the preceding examples was obtained, having the following probable formula:

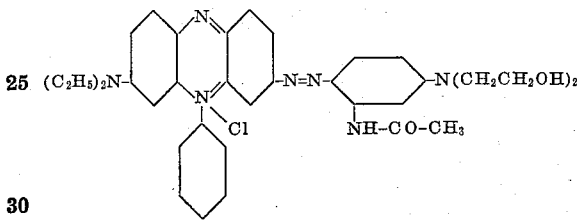

Example 5

The procedure of Example 1 was repeated substituting 15 parts of N,N,N',N'-tetra-2'-hydroxyethyl-m-phenylene diamine for the N-di-2'-hydroxyethylamino aniline of the first example. The resulting dyestuff had dyeing properties similar to those of the preceding examples and yielded brilliant, slightly reddish black shades on leather. The formula of the dyestuff was as follows:

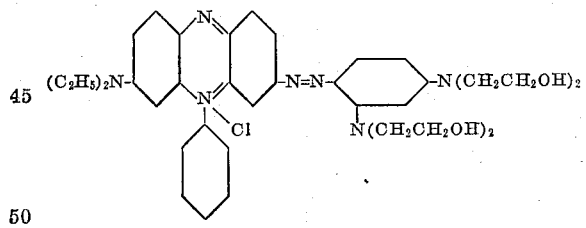

Example 6

The procedure of Example 1 was repeated, substituting 13.4 parts of 3-(N-di-2'-hydroxyethyl-amino) p-acetanisidide for N-di-2'-hydroxyethyl aniline as the coupling component. A dyestuff yielding a black shade and having dyeing properties similar to those of the preceding examples was obtained, the formula of said dyestuff being as follows:

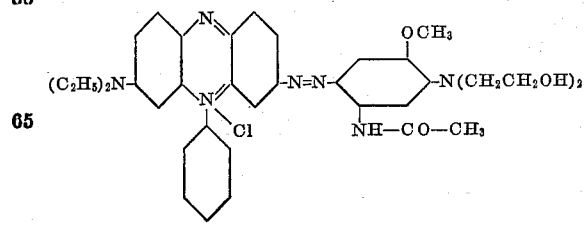

Other water-soluble dyestuffs, having similarly outstanding penetrating power when employed for dyeing leather, and yielding even, brilliant shades of equal or superior density as compared with related dyestuffs of the prior art, are similarly obtained by coupling other safranine diazo compounds, e. g., the diazo compounds derived from Safranine Y Extra Conc. or Safranine 6B, with para-coupling N-hydroxyalkyl arylamines or substitution products thereof in the manner illustrated by the examples.

The dyestuffs of the present invention are applied in aqueous solution for dyeing mordanted leather in the usual manner, e. g., hematine-mordanted quebracho-tanned sheep leather, or chrome-tanned calf leather. For example, the leather is placed together with an aqueous solution in a dyeing drum, the drum is rotated, and an aqueous solution of a dyestuff of the present invention is introduced into the drum. Rotation of the drum is continued until the dyeing is complete, whereupon the leather can be fat-liquored or otherwise treated for further processing. The dyestuffs of the invention show excellent penetration, yielding a product which is highly resistant to injury from scuffing or other mechanical wear, and the leather is dyed evenly in brilliant shades of excellent fastness properties.

The dyestuffs of this invention are also useful in the manufacture of hectograph ink compositions, and in the dyeing of paper.

Variations and modifications which will be obvious to those skilled in the art can be made in the products and processes of my invention without departing from the scope or nature thereof.

I claim:

1. A dyestuff suitable for producing brilliant dense shades on leather with outstanding penetration thereof, having the general formula:

$$R-N=N-Ar-N\begin{matrix}R_1\\R_2\end{matrix}$$

wherein R is the radical of a safranine compound, in which the azo linkage occupies one of the positions 3 and 6 of the safranine nucleus R₁ is a member of the group consisting of hydrogen, lower alkyl, monocyclic aralkyl and phenyl groups, and an hydroxyalkyl group of two to four carbon atoms; R₂ is an hydroxyalkyl group of two to four carbon atoms; and Ar is a member of the class consisting of benzene and naphthalene nuclei in which the diazo linkage is para to the

radical, and in which the remaining nuclear positions are occupied by members of the class consisting of hydrogen, halogen, alkyl, alkoxy, alkylamino, hydroxyalkylamino and acylamido groups.

2. A dyestuff suitable for producing brilliant dense greenish-black shades on leather with outstanding penetration thereof, having the following formula:

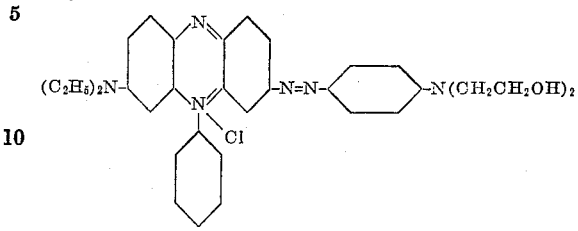

3. A dyestuff suitable for producing brilliant dense dark green shades on leather with outstanding penetration thereof, having the following formula:

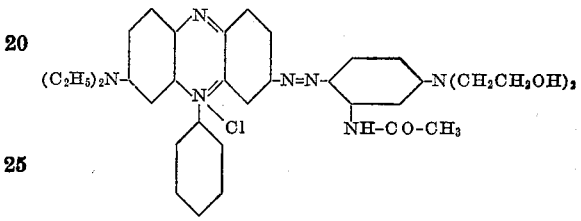

4. A dyestuff suitable for producing brilliant dense reddish-black shades on leather with outstanding penetration thereof, having the following formula:

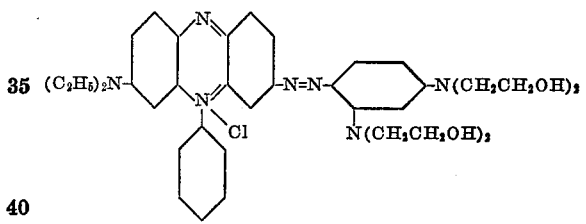

JOHN J. HAYDEN.

REFERENCES CITED

The following references are of record in the file of this patent:

UNITED STATES PATENTS

| Number | Name | Date |
|---|---|---|
| 613,920 | Gutzkow | Nov. 8, 1898 |
| 2,188,774 | Fellmer et al. | June 30, 1940 |

FOREIGN PATENTS

| Number | Country | Date |
|---|---|---|
| 7,337 | Great Britain | of 1897 |

OTHER REFERENCES

Wilson: "The Chemistry of Leather Manufacture," 2nd edition, vol. II, 1929, page 854.